United States Patent [19]
Redgrave

[11] Patent Number: 5,443,135
[45] Date of Patent: Aug. 22, 1995

[54] BRAKE SHOE ROLLER INSERT

[75] Inventor: Christopher A. Redgrave, Portage, Mich.

[73] Assignee: Eaton Corporation, Cleveland, Ohio

[21] Appl. No.: 368,580

[22] Filed: Jan. 4, 1995

Related U.S. Application Data

[63] Continuation of Ser. No. 98,092, Jul. 28, 1993, abandoned.

[51] Int. Cl.6 ............................................. F16D 51/00
[52] U.S. Cl. ................................. 188/250 F; 188/332
[58] Field of Search ............ 188/250 C, 250 R, 250 F, 188/250 B, 250 P, 329, 330, 332, 338, 339

[56] References Cited

U.S. PATENT DOCUMENTS

| | | | |
|---|---|---|---|
| 1,915,000 | 6/1933 | McDonald | 18/250 F |
| 1,919,974 | 7/1933 | Blume | 188/250 F |
| 1,924,590 | 8/1933 | Babel | 188/250 F |

FOREIGN PATENT DOCUMENTS 1396473  6/1975  United Kingdom ............ 188/250 F Primary Examiner—Matthew C. Graham
Attorney, Agent, or Firm—Loren H. Uthoff, Jr.; Howard D. Gordon

[57] ABSTRACT

A replaceable roller insert is provided for supporting a cam roller follower within roller supports acting against a cam element moving at least one brake shoe inward and outward relative to a brake drum where the roller insert is easily replaced by removing a worn roller insert and mounting a replacement roller insert to the brake shoe web.

1 Claim, 2 Drawing Sheets

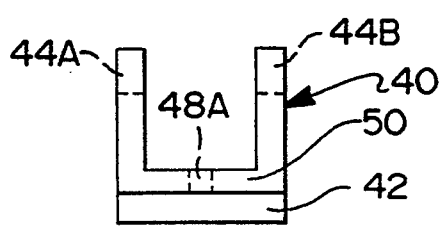
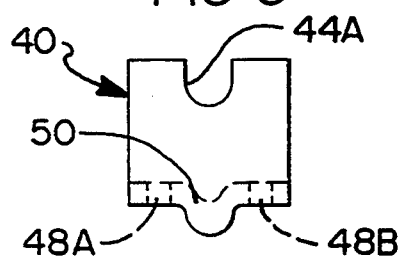
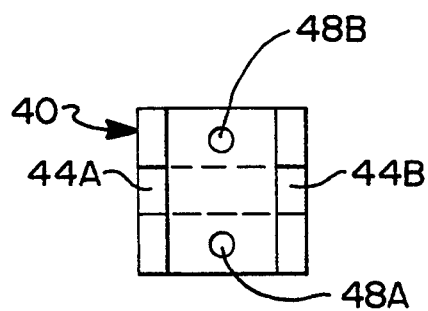
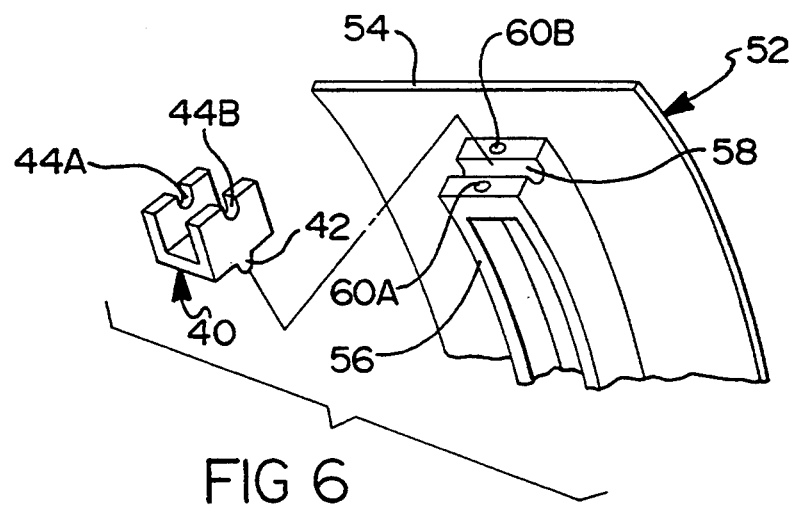

BRAKE SHOE ROLLER INSERT

This is a continuation of application Ser. No. 08/098,092 filed on Jul. 28, 1993 now abandoned.

FIELD OF THE INVENTION

This invention relates to a brake shoe for a vehicular drum brake. More specifically, this invention relates to a brake shoe having a web section holding a roller insert supporting a cam roller follower acted upon by a cam activation mechanism.

DESCRIPTION OF THE PRIOR ART

Methods of activating the brake shoes in a vehicle drum brake to expand the brake shoes for frictional contact with the brake drum are well known in the art. Such assemblies characteristically include a stationary backing or torque plate secured to the end of the axle and about which rotates a rotary drum to which the wheel is secured. The brake assembly features a pair of opposed brake shoe assemblies that are respectively pivotally mounted at one end of the backing plate within the drum and carry frictional braking material facing theretowards. The braking material is mounted to a brake table by a fastening means such as adhesive bonding or riveting. The brake table is supported by a brake web section that reacts with the pivot mount and an expansion means such as an "S" cam.

Expanding shoe drum brakes, especially air or hydraulically actuated drum brake systems wherein arcuate brake shoes nonrotatably secured to a portion of a wheeled vehicle are pivotably rotated about an anchor member or members into engagement with a rotating annular brake drum for the purposes of retarding the velocity of the wheeled vehicle by the use of a brake actuating member, such as a displaceable cam element, are also well known in the art. The brake actuating member, usually a rotatable cam element or a linear wedge element, is located between the adjacent ends of the pivotal brake shoes and secured to a rotatably cam shaft or a linear actuation shaft, respectively, for translating oscillatory, generally linear motion from a power source, such as an air motor or the like, to the brake shoes.

The actuating member, often in the form of a so called "S" cam or a wedge, is usually located between cam or wedge followers, often in the form of rollers or the like, rotatably fixed to the brake shoes where the S cam operates directly against the roller cam follower. The cam follower is supported at one end of the brake web section by a cam roller slot.

The forces generated in rotating the S cam against the roller element and the brake web and are satisfactorily handled without excessive wear due to the steel material used to fabricate the S cam, the roller element and the brake web. The most significant wear occurs in the cam roller slot which ultimately requires that the whole brake shoe be replaced at great cost.

SUMMARY OF THE INVENTION

The present invention discloses a device to allow for the expeditions and inexpensive replacement of the cam roller slot section of a brake shoe without requiring the replacement of the total brake shoe. A roller insert made of a steel or other long wearing material is securely mounted at one end of the brake shoe on the brake web. The insert is shaped on one side like the traditional cam roller slot to receive the cam roller element and on the opposite side is shaped to be secured to a flat portion of the brake web. The type of roller insert of the present invention would be of particular value with cast metal brake shoes due to their expense of replacement due to cam roller slot section wear. Using the present invention, only the roller insert rather than the complete shoe would be replaced upon discovery of a wear-out condition of the cam roller slot section. At the same time, the brake table can be relined with a new brake pad if required.

A provision of the present invention is to provide a replaceable cam roller slot in the form of a roller insert for a brake shoe.

Another provision of the present invention is to provide a roller insert having a locating detent for positioning on the supporting brake web.

Still another provision of the present invention is to provide a roller insert having heat treated ridges for the brake shoe roller to react against.

BRIEF DESCRIPTION OF THE DRAWINGS

FIG. 3 is a front view of the roller insert of the present invention;

FIG. 4 is a top view of the roller insert of the present invention;

FIG. 5 is a side view of the roller insert of the present invention; and

FIG. 6 is a perspective view of the replaceable roller insert of the present invention mounted on a stamped steel shoe.

DETAILED DESCRIPTION OF THE PREFERRED EMBODIMENT

Figure 1:
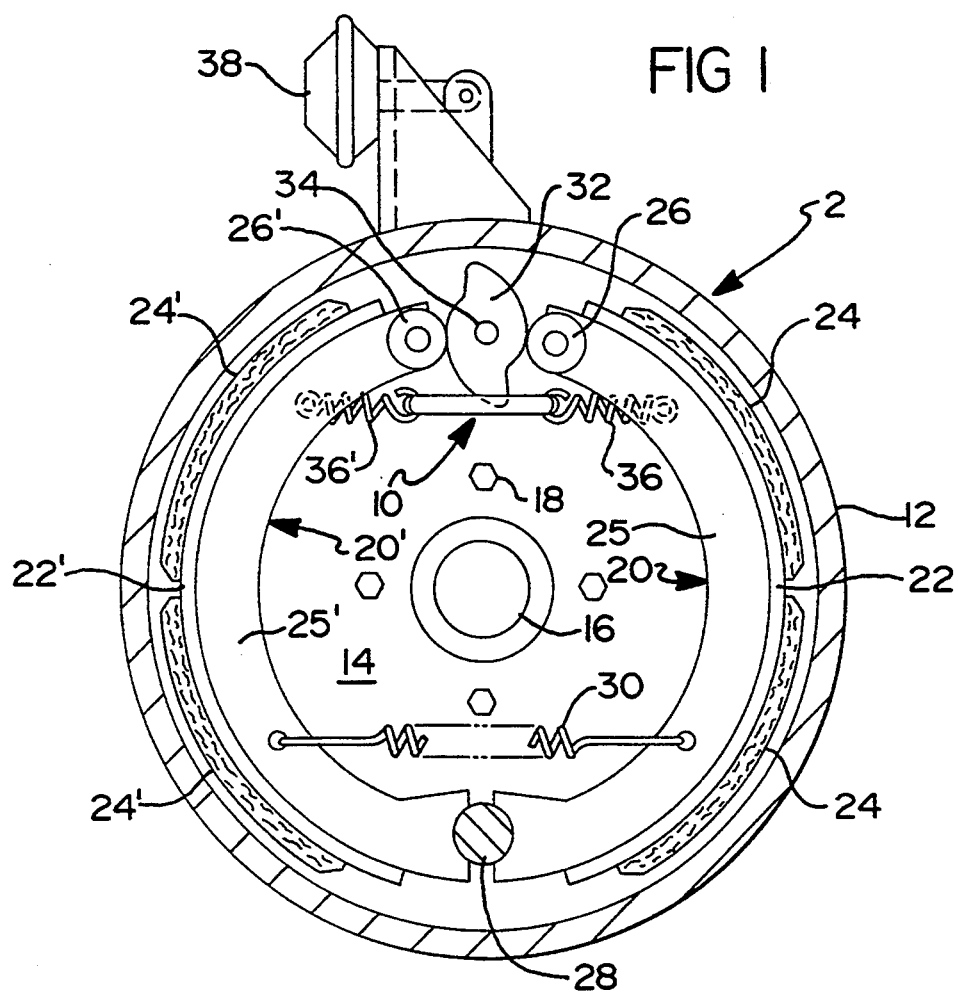
FIG. 1 is a front cross-sectional view of a drum brake assembly.

The prior art brake shoe assembly of FIG. 1 comprises a backing plate or spider 14 secured by means such as bolts 18 to the stationary section of a vehicular axle end 16 having a rotary brake drum 12 that rotates with the wheel and is frictionally braked to slow or stop the wheel when the brakes are applied by the operator.

Assembly 2 comprises a pair of opposed arcuate brake shoe assemblies 20 and 20' that are pivotally mounted at one end on stationary pin 28 (also can be two pins) by suitable means such as coiled tension spring 30 connected directly between brake shoes 20 and 20' near stationary pin 28 as shown in FIG. 1.

A rotary actuator, commonly in the form of a shaft 34, extends through an opening in backing plate 14. Shaft 34 has a rotary "S" cam 32 well known in the art secured at its end.

Brake shoe assemblies 20 and 20' respectively carry cam roller followers 26 and 26' at their opposite ends that respectively engage cam 32 providing a rolling contact as the cam 32 is rotated to cause brake shoe assemblies 20 and 20' to pivot away from each other when cam 32 is caused to rotate such as by means of pressurized fluid in chamber actuator 38 when the brakes are applied by the operator.

Brake shoe assemblies 20 and 20' include brake tables 22 and 22' respectively that have pads of suitable frictional braking material 24 and 24' suitably secured thereto that frictionally brake rotary drum 12 when cam 32 rotates to pivot assemblies 20 and 20' away from each other sufficiently to cause engagement of frictional material 24 and 24' with rotary drum 1-2 when the brakes are applied by the operator. Brake shoe assemblies 20 and 20' include a pair of spaced apart steel brake webs 25 and 25' that respectively support brake tables 22 and 22' or in the case of a cast metal brake webs 25 and 25' the pair of steel webs are replaced by a single cast section.

It has been common practice in the past to employ a return spring or a pair of return springs 36 and 36' connected by chip 10 that are operative to urge the brake shoe assemblies 20 and 20' back towards each other for a distance sufficient to disengage frictional material 24 and 24' from rotary drum 12 when the brakes are released by the operator.

Figure 2:
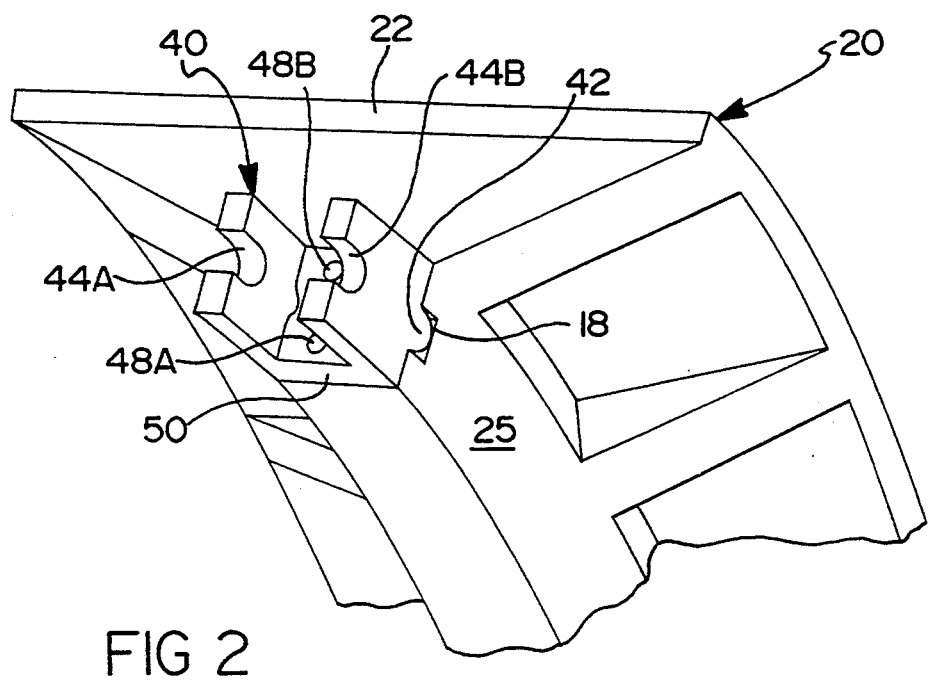
FIG. 2 is a perspective view of the replaceable roller insert of the present invention mounted on a cast brake shoe.

Referring to FIGS. 1 and 2, a perspective view of the roller insert 40 of the present invention is shown in FIG. 2 mounted to the brake web 26 of a brake shoe assembly 20. The brake shoe assembly 20 consists of a brake table 22 upon which a brake pad 24 is bonded or riveted which frictionally reacts with the brake drum 12. The brake shoe assembly 20 is shown in a configuration where the brake table 22 and the brake web 25 are cast as one piece. Only a portion of the brake shoe assembly 20 is shown where one end of the brake web 25 extends and is shaped to pivot on the stationary pin 28 (see FIG. 1) which protrudes from the brake spider 14. The second end of the brake web 25 as shown in FIG. 2, reacts against the cam roller follower 26 which in turn reacts against the cam 32 which is rotated so as to force the brake shoe assembly 20 toward the brake drum 12 for eventual frictional contact thereby inducing a retarding force. The operation and structure of such a brake is best disclosed by reference to U.S. Pat. Nos. 4,476,968 and 5,062,506, the disclosures of which are hereby incorporated by reference.

Forming the second end of the brake web 25 is a roller insert 40, which is made of a material that is wear resistant, such as steel, since the cam roller follower 26 is held in the roller supports 44A and 44B and very sizeable forces are generated between the cam, the cam roller follower 26 and the roller supports 44A and 44B. The roller insert 40 can be heat treated especially in the area of the roller supports 44A and 44B to further increase the wear resistance.

The roller insert 40 employs a positioning rib 42 along its base which engages a positioning slot 46 cut in the brake web 25. The positioning rib 42 holds the roller insert 40 in position especially in a direction so as to oppose the forces from the cam roller follower 26. Two fastener openings 48A and 48B are used to securely fasten the roller insert 40 to the brake web 25 which can be in the form of bolts or rivets or other type of appropriate fasteners which pass through the fastener openings 48A and 48B and thread or are otherwise retained on the brake web 25.

FIG. 3 is a front view of the roller insert 40 of the present invention where the positioning rib 42 is extended from the insert base 50 of the roller insert 40 and has a radius formed along its edge to facilitate installation into the positioning slot 46. The positioning rib 42 could be shaped to completely fill the positioning slot 46.

FIG. 4 is a top view of the roller insert 40 of the present invention. Clearly shown are the fastener openings 48A and 48B and the two roller supports 44A and 44B which engage the cam roller follower 26 and hold it in place when acted upon by the cam 32.

FIG. 5 is an end view of the roller insert 40 of the present invention where the radiused edges of the positioning rib 42 are more clearly shown. The positioning rib 42 can be formed by stamping the inside of the roller insert 40 to produce the radius shape as shown with the hidden line in FIG. 5 along the insert base 50.

Now referring to FIG. 6, the roller insert 40 of the present invention is shown adapted to be fitted to a steel brake shoe 52 fabricated from steel stampings. Both the brake table 54 and the brake web 56 are fabricated from steel stampings and joined together to form the steel brake shoe 52. Using normal construction, a brake pad (not shown) is joined to the brake table 54 and frictionally interacts with a brake drum (not shown) when the brake shoe 52 is pivoted at its first end (which is not shown) by movement of the second end containing the roller insert 40 of the present invention. FIG. 6 shows the roller insert 40 separated from the brake shoe 52 prior to assembly where the roller insert 40 is attached to the brake web 56 using a fastening means such as bolts. A positioning slot 58 is formed in the end of the brake web 56 along with two fastener threaded sections 60A and 60B to accept and retain the roller insert 40 in position. The brake web 56 also has the end surface substantially flat to better support the insert base 50 of the roller insert 40 for more effective load transfer into the brake shoe 52.

From the foregoing, it should be apparent that a new and improved device has been provided to improve the servicing and service life of drum braking systems by providing a replaceable roller insert that can be easily replaced instead of replacing the whole brake shoe. Although the present invention has been herein above described with respect to the illustrated embodiments, it will be understood that the invention is capable of modification and variation, which will be encompassed by the scope of the following claims.

I claim:

1. A brake shoe for an S cam type vehicle drum brake having a cam actuator and a cam roller follower comprising:

an arcuate brake table having a first and a second side, said first side supporting a friction brake pad for contacting a brake drum;

a brake web attached to said second side of said brake table extending inward toward the center of radius of said arcuate brake table, said web having a first end pivotably supported and a second end having a substantially flat surface with a positioning slot formed therein, said surface being substantially perpendicular to said brake table;

a hardened steel roller insert having an insert base removeably attached to said flat surface, said roller insert having a pair of roller supports extending from said insert base for supporting the cam roller follower, and having a positioning rib formed on said insert base facing opposite to said roller supports, said positioning rib engaging said positioning slot thereby stabilizing said roller insert on said flat surface;

attachment means for removeably securing said roller insert to said flat surface of said brake web.

* * * * *